(12) United States Patent
Schuermans et al.

(10) Patent No.: US 7,466,757 B2
(45) Date of Patent: Dec. 16, 2008

(54) METHOD FOR TRANSMITTING DATA ON A BUS

(75) Inventors: Roel Schuermans, Enzweihingen (DE); Tobias Ostgathe, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 417 days.

(21) Appl. No.: 10/531,842

(22) PCT Filed: Oct. 17, 2003

(86) PCT No.: PCT/DE03/03491

§ 371 (c)(1),
(2), (4) Date: Oct. 13, 2005

(87) PCT Pub. No.: WO2004/039030

PCT Pub. Date: May 6, 2004

(65) Prior Publication Data

US 2006/0104371 A1 May 18, 2006

(30) Foreign Application Priority Data

Oct. 18, 2002 (DE) ................................ 102 48 672

(51) Int. Cl.
*H04B 3/00* (2006.01)
(52) U.S. Cl. .................... 375/257; 709/236; 370/474
(58) Field of Classification Search ................ 375/257
See application file for complete search history.

(56) References Cited

U.S. PATENT DOCUMENTS

| 6,038,607 | A | * | 3/2000 | Hamilton et al. | ............ 709/236 |
| 6,131,809 | A | | 10/2000 | Bowser et al. | |
| 2004/0170195 | A1 | * | 9/2004 | Slivkoff et al. | .............. 370/474 |

FOREIGN PATENT DOCUMENTS

EP 1 085 423 3/2001

OTHER PUBLICATIONS

CAN Specification, Sep. 1991, Robert Bosch GmbH, Spec 2.0, pp. 4, 7, 10, 12, 15.*

* cited by examiner

*Primary Examiner*—Shuwang Liu
*Assistant Examiner*—David Huang
(74) *Attorney, Agent, or Firm*—Kenyon & Kenyon LLP

(57) ABSTRACT

A method for transmitting data blocks from a data source to a data sink on a bus, which supports the transmission of frames having a variable and limited number n of data elements, has the following steps: a) transmitting, from the data sink to the data source, control information which specifies at least the number N of data elements contained in a block to be transmitted; b) if N>n, transmitting int frames each containing n data elements of a block to be transmitted and transmitting a frame having data elements of the block to be transmitted from the data source to the data sink, int being the largest integer which is less than or equal to N/n; c) recognizing the transmission of a block as complete by the data sink if the number of data elements received in step b) agrees with the number N specified in the control information.

9 Claims, 2 Drawing Sheets

METHOD FOR TRANSMITTING DATA ON A BUS

FIELD OF THE INVENTION

The present invention relates to a method for transmitting data blocks from a data source to a data sink on a bus, which supports the transmission of frames having a variable and limited number of data elements. When the number of data elements of such a block is greater than the maximum number of data elements transmissible in a frame, the block must be transmitted split up into a plurality of frames. A data sink which receives these frames must then restore the block therefrom.

BACKGROUND INFORMATION

Correct restoration of the block is impossible if frames may become lost without being noticed in the transmission from the data source to the data sink or if a frame representing the last frame in transmitting a block is not recognized as such and other subsequently received frames are assigned to the same block by the data sink.

The problem of transmitting extensive data blocks which do not fully fit in a frame arises in particular in developing data processing systems based on the CAN standard, for example, of automotive control units. The CAN standard is highly suitable for transmitting small amounts of data within predefined time periods from a sensor to a control unit or from a control unit to an actuator to influence the operating state of an automotive engine or other units of the motor vehicle. However, in developing and optimizing such a system, extensive amounts of data must often be transmitted between the control unit and a host computer of a development environment, enabling the developer to follow the operation of the control unit in an accurate and detailed manner during its dialog with the host computer.

The transmission of such amounts of data via the CAN bus requires considerable overhead and results in a substantial load on the transmission capacity of the CAN bus. When communication of the control unit with the host computer competes for transmission capacity with other communication processes taking place on the bus and required for the control functions performed by the control unit, the transmission capacity may turn out to be insufficient for all functions, and the operability of the unit may be negatively affected.

SUMMARY OF THE INVENTION

The present invention provides a method for transmitting data blocks on a bus between a data source and a data sink, which needs little transmission overhead and therefore efficiently uses the bandwidth available on the bus. The method is based on the fact that it is the data sink that specifies the format, in particular the number of data elements of a data block which it expects to receive from a source. The number of elements may be larger than the number of data elements transmissible in a single frame supported by the bus system. If this is the case, the data elements of a block must be split into a plurality of frames before the frames are transmitted over the bus to the sink. If N is the number of data elements of a block to be transmitted and n is the maximum number of data elements transmissible in a frame, the block completely fills int (N/n) frames, int (N/n) being the largest integer that is less than or equal to N/n. When these completely filled frames have been transmitted, an additional frame containing (N mod n) data elements is transmitted. The number of data elements of this last frame may therefore also be zero if N is divisible by n without a remainder. From the fact that a frame having less than the maximum number n of data elements has been received, the data sink is able to draw the conclusion that it has received the last frame of a block. A comparison of the number of data elements actually received with the expected number N permits the data sink to conclude that the block has been received completely.

If number N of data elements of a block to be transmitted is less than maximum number n of data elements transmissible in a frame, the above-described method may be used unchanged in principle. In this case, int (N/n)=0, i.e., only a single frame having the N data elements is transmitted, which is immediately recognized by the data sink as the last frame of the block.

An advantageous special arrangement is possible if the number of data elements N of the block is equal to the maximum number of data elements n of the frame. Since the data sink has specified the number of data elements of the block to be transmitted and is aware of this number as it receives the block, it is able to recognize, right after having received a full frame, that the entire block contained therein has been received. Because no further frames which may possibly become lost or otherwise transmitted erroneously are to be transmitted, it is not necessary to transmit a frame without data elements to indicate the transmission of the entire block to the sink.

The control information transmitted by the data sink to the data source advantageously specifies not only the number of elements in a block to be transmitted, but also the time (or, in the case of periodic transmission, the times), type, and meaning of the parameters to be transmitted.

DETAILED DESCRIPTION

Figure 1:
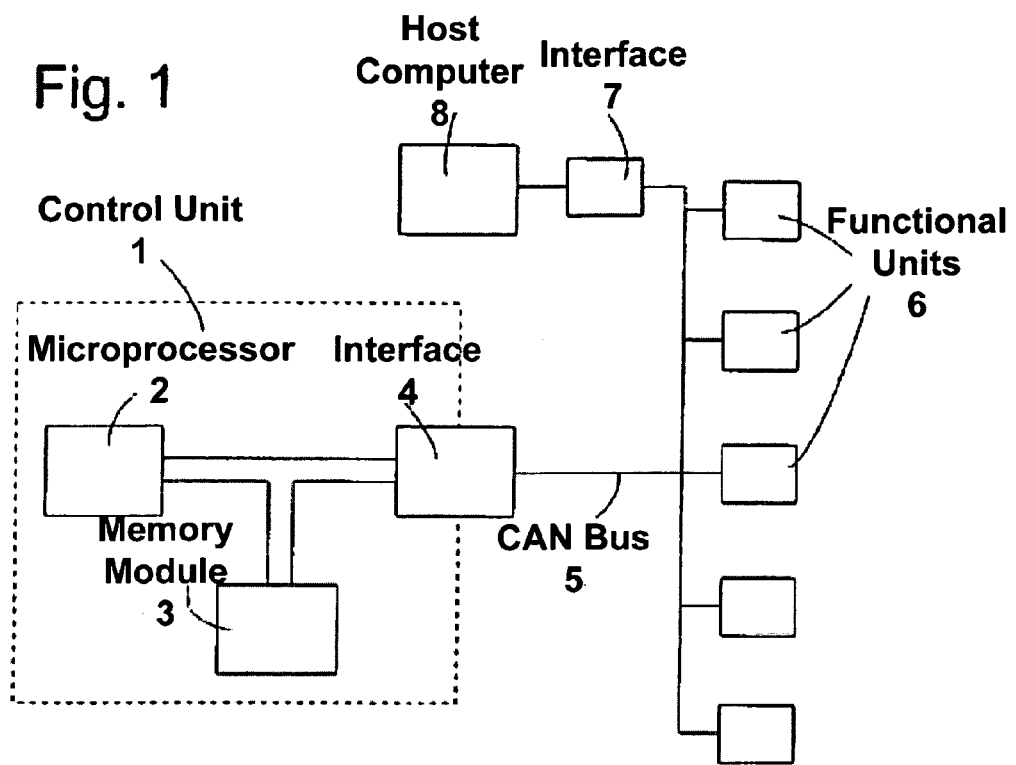
FIG. 1 shows a block diagram of an exemplary data processing system in which the method according to the present invention is applicable.

The block diagram of FIG. 1 shows as an example of the data processing system according to the present invention a development environment for a controller, in particular a motor vehicle control unit. Control unit 1 includes a microprocessor 2, a memory module 3, and an interface 4 to a bus, in particular a CAN bus 5, to which a plurality of function units 6 of the motor vehicle are connected, which provide measured values of operating parameters of the vehicle to control unit 1 over bus 5 and/or receive and execute instructions from control unit 1. The function units may be, for example, rotation angle sensors on a crankshaft of the vehicle engine, which deliver a measured value of the rotation angle of the crankshaft to control unit 1, or they may be spark plugs of the engine, which receive an ignition instruction derived from the measured values of the rotation angle which may be received by control unit 1. The function units may also perform various other measuring and regulating functions which are not described here in detail.

While control unit 1 is still in the testing and development phase, an interface 7, via which a host computer 8 of the development environment is able to communicate with control unit 1, is connected to CAN bus 5.

Host computer 8 makes it possible, for example, to read data gathered from the different function units 6 and saved in memory module 3 by control unit 1 and display this data to a developer who is then in a position to evaluate the operation of microprocessor 2 and to eliminate any errors in its operation by changing the control program of microprocessor 2.

In the communication of microprocessor 2 with function units 6, small amounts of data are generally transmitted under strict time requirements. This means that if one of function units 6 has delivered a parameter value, control unit 1 must respond in a predefined short time, and it is not possible, for example, to gather a plurality of measured values of the function unit and to transmit these measured values as a single overhead information record to improve the effectiveness of the transmission. For this reason, the CAN bus protocol uses relatively short frames having a maximum of 8 bytes of useful data content, in which the overhead portion in the total transmitted data set is rather high, but which make it possible to transmit data with short delays for this purpose.

Figure 2:
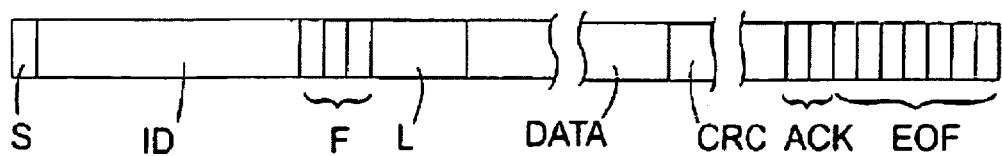
FIG. 2 shows the structure of a CAN frame.

This is illustrated by FIG. 2, which shows the structure of a CAN frame in detail. A single start bit S identifies the beginning of the frame. It is followed by an 11-bit long ID field which contains a unique identification of the device connected to CAN bus 5 (one of function units 6 of control unit 1 or one of the processes running thereon or host computer 8 or one of the processes running thereon) for which the useful data of the corresponding CAN frame is intended.

Three status flags F follow, which specify the properties of the CAN frame which are not relevant to the present invention and are not further explained.

A subsequent 4-bit field L specifies the number of useful data bytes contained in the CAN frame. This number may be between 0 and 8 bytes.

The length of the following DATA segment corresponds to the number of bytes specified in field L.

A 16-bit long check number field CRC permits the transmission errors occurring in the previous fields to be recognized and eliminated in a conventional manner. Two acknowledge bits ACK and a 7-bit long field ELF having a bit pattern indicating the end of the frame follow. One to three bits, which transmit no information, may be inserted before the start of the next frame.

While the CAN protocol is well suited for transmitting small amounts of data with short response times, problems arise when large, contiguous amounts of data which do not fit in a single CAN frame are to be transmitted. These must be split into a plurality of frames by the data source sending on bus 5, and recombined by the receiving sink fully and in the correct order. This may fail in particular when the data sink does not recognize or ignores one of the frames intended for it due to an error in the transmission of identification segment ID, when it wrongly perceives a frame as intended for it for the same reasons, or when an error occurs in receiving length field L, useful data are erroneously transmitted, or the like. To prevent this from happening, or at least to recognize and catch such errors, one of the eight useful data bytes of each frame may be used in conventional systems to transmit a serial number which permits the data sink to detect gaps in the sequence of the frames it has received or frames erroneously assigned to it. The transmission of such a serial number additionally increases the overhead portion of the frame and reduces the effectiveness of the data transmission.

To solve this problem, the present invention makes use of the fact that in many transmission tasks the data sink is aware in advance of the size of the data record to be transmitted. This is the case in particular in a data processing system as the one in FIG. 1, when measured data or other operating parameters of control unit 1 are transmitted to host computer 8. This takes place in general in response to a previous prompt by host computer 8 which is thus "aware" which and what amount of data is to be transmitted by control unit 1. When the host computer has received information from the control unit that the latter considers the transmission of a data block completed, it is sufficient to compare the amount of data actually received in the block to the previously known amount to determine whether transmission errors have occurred, and to recognize the transmission as successful if the received amount of data agrees with the expected amount.

A procedure of control unit 1 and host computer 8, which cooperate according to the above-explained principle, is described with reference to the flow diagrams in FIGS. 3 and 4.

Figure 3:
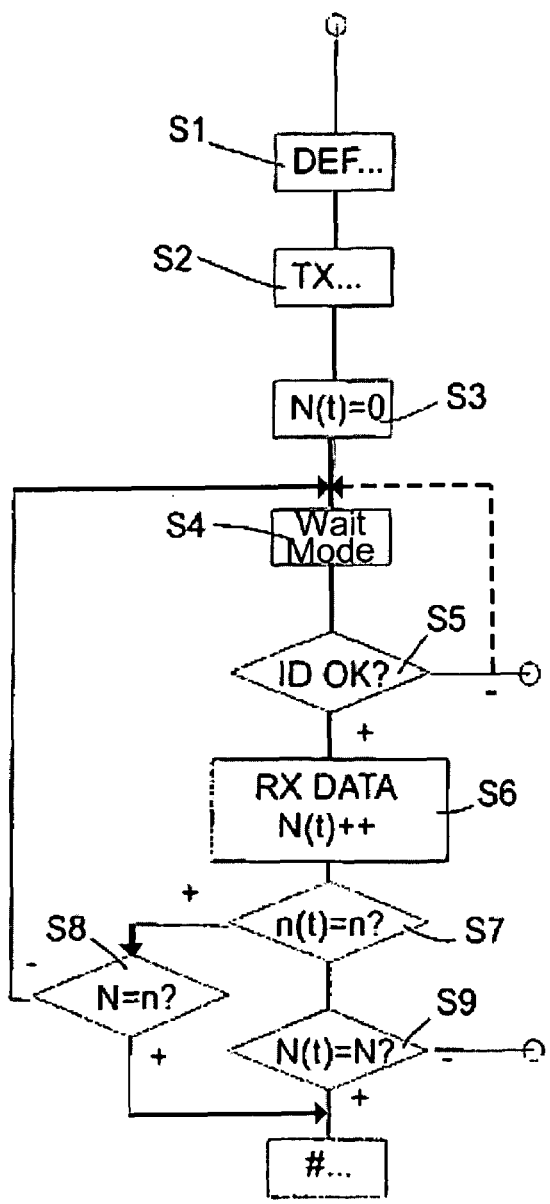
FIG. 3 shows a flow diagram of a processing sequence performed by the control unit of FIG. 1 within the method according to the present invention.
Figure 4:
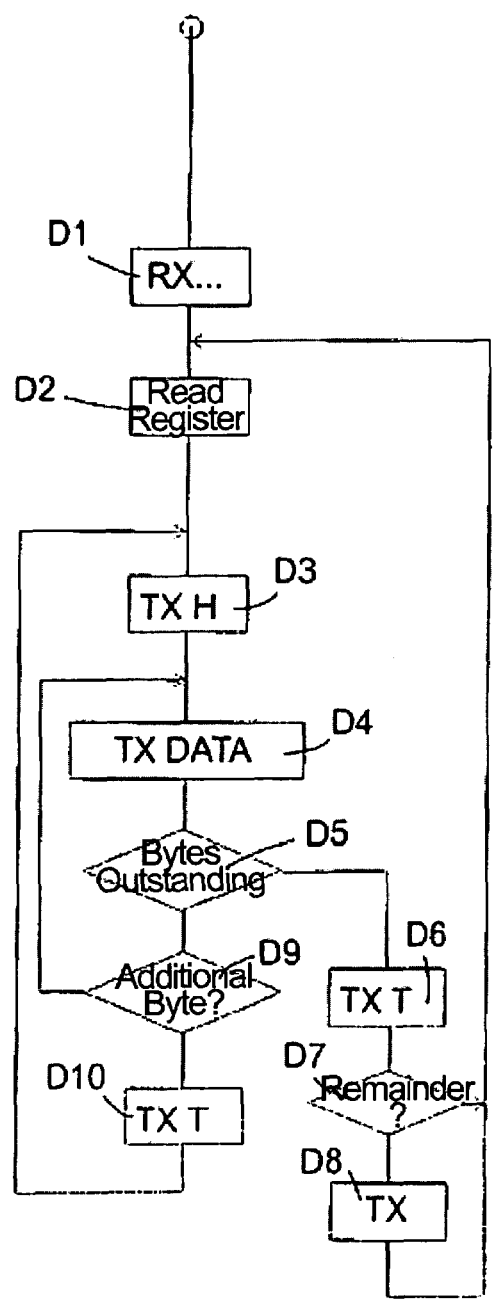
FIG. 4 shows a flow diagram of a processing sequence performed by the host computer.

FIG. 3 shows the mode of operation of the data sink, in the present example host computer 8, and FIG. 4 shows the mode of operation of the data source, i.e., control unit 1.

In step S1, a developer defines, in the dialog with host computer 8, the structure of a data block which is to be transmitted from control unit 1 into host computer 8. The definition of this structure includes in particular establishing a value of identifier ID, which later makes it possible to assign the transmitted frames to the process running on the host computer which needs them. Furthermore, the parameters to be transmitted are determined, i.e., a list of the registers or memory locations of memory module 3 of control unit 1 whose content is to be transmitted to host computer 8 and the order in which these parameters are to be transmitted is established. Finally, a point in time at which the corresponding memory locations are to be read is established. The point in time may be a single, absolutely established point in time, it may be defined by a certain time relationship to the occurrence of an external condition, for example, with a specified delay after triggering of a certain interrupt, or periodic transmission using a specified period may be provided.

The control information thus established is transmitted to control unit 1 in step S2. For the sake of simplicity, it is to be assumed that the amount of control information 8 to be transmitted does not exceed eight bytes, so that the control information may be transmitted in a single conventional CAN frame. If the control information to be transmitted includes more than eight bytes, the method described in the following for transmitting a data block from the data source to the data sink may also be used for transmitting control information from the data sink to the data source.

The control information is received by the data source, here control unit 1 (step D1 in FIG. 4). In the meantime, the data sink prepares for receiving a first block of data by setting a counter N (t) to 0 (step S3). It subsequently enters wait mode S4, in which it waits for the arrival of a frame via CAN bus 5.

At the same time, the data source waits for the point in time specified in the control information to read register (D2). At the specified point in time, it begins reading the register and sends header H of a CAN frame, i.e., the segments identified by S through L in FIG. 2, to host computer 8, which checks in step S5 whether identifier ID transmitted in header H agrees with the expected identifier. If there is no agreement, host computer 8 either returns to wait mode S4 or branches to another processing sequence if identifier ID corresponds to another process also executed by it.

In the meantime, the control unit transmits a data byte of the frame in step D4. Subsequently (D5) the control unit checks whether the data bytes to be transmitted according to the definition of the block are still outstanding. If this is not the case, the tail segment (trailer) of the CAN frame, i.e., from the CRC segment to the EOF segment, is transmitted in step D6. A check is subsequently performed in step D7 to determine whether number of bytes N of the block is different from n or is divisible by n without a remainder. If one of these conditions is met, another frame without useful data is transmitted in step D8 before the process returns to step D2 unless the block is to be transmitted again. Otherwise the method is terminated immediately or returns immediately to D2 without transmitting an empty frame.

If the check in step D5 results in that more data bytes are to be transmitted, the method proceeds to step D9, in which a check is performed to determine whether an additional byte is to be transmitted in the frame being transmitted. If so, the method returns to step D4 to transmit the byte; if not, the trailer segment is transmitted in step D10, and the method returns to step D3 to begin the transmission of another frame by transmitting the header.

If host computer 8 has found the frame identifier to be correct in step S5, it receives a data byte in step S6 and increments counter N (t) of the bytes received. Subsequently it compares, in step S7, number n (t) of useful data bytes contained in this frame specified in length field L of header H with the maximum allowable number of useful data bytes n=8. If the two values agree, the method branches to step S8, in which the host computer compares the total number of data bytes N contained in the block to be transmitted, which is known to it from block definition step S1, to the maximum allowable number of bytes n of a frame. If the two numbers do not agree, this means that the transmission of further CAN frames carrying further bytes of the same block is to be expected, and the method returns to the wait mode of step S4. However, if step S7 determines agreement of the two numbers, this means that the block contains a total of only ≦8 data bytes, and its transmission is thus complete. In this case, the method goes to the processing of the data bytes received in step S9.

If host computer 8 determines in step S7 that the number of bits n (t) transmitted in the current frame is the maximum allowable number of bits n, this means that this is the last frame of a block. Host computer 8 then compares (S9) number N (t) of the data bytes of this block received so far to number of bytes N according to the definition of step 1. If the two numbers are not equal, an error must have occurred, and the method branches to an error processing routine, in which the entire block may be discarded, for example, or reprocessing of the block may be requested. If the two numbers agree, the block is considered to be correctly received and is processed in step S9.

The method subsequently returns to step S3 to reset byte counter N (t) to 0 and to wait for the transmission of another data block.

Using this method, it is achieved that the entire transmission capacity of the CAN frame is available for transmitting useful data even in transmitting contiguous useful data blocks which include more useful data bits than may be accommodated in a CAN frame, and no additional useful data transmission capacity needs to be assigned to the transmission of control information. The method is compatible with existing standards concerning data transmission on the CAN bus.

What is claimed is:

1. A method for transmitting a data block from a data source to a data sink on a bus that supports a transmission of a frame having a variable and limited number n of data elements, comprising:
   transmitting, from the data sink to the data source, control information that specifies at least a number N of data elements contained in a block to be transmitted;
   if N>n, transmitting int (N/n) frames, each containing n data elements of the block to be transmitted and transmitting a frame having (N mod n) data elements of the block to be transmitted from the data source to the data sink, int (N/n) being the largest integer which is less than or equal to N/n; and
   recognizing the transmission of the block as complete by the data sink if the number of data elements received in the step of transmitting int (N/n) frames agrees with the number N specified in the control information;
   wherein the data source transmits the block at a point in time specified in the control information.

2. The method as recited in claim 1, wherein if N=n, the data source transmits a single frame having N data elements, and the data sink recognizes the block as complete already after receiving the single frame.

3. The method as recited in claim 1, wherein the data source forms the block from a plurality of parameters specified in the control information.

4. The method as recited in claim 1, wherein the bus is a CAN bus.

5. A method for transmitting a data block from a data source to a data sink on a bus that supports a transmission of a frame having a variable and limited number n of data elements, comprising:
   transmitting, from the data sink to the data source, control information that specifies at least a number N of data elements contained in a block to be transmitted;
   if N>n, transmitting int (N/n) frames, each containing n data elements of the block to be transmitted and transmitting a frame having (N mod n) data elements of the block to be transmitted from the data source to the data sink, int (N/n) being the largest integer which is less than or equal to N/n; and
   recognizing the transmission of the block as complete by the data sink if the number of data elements received in the step of transmitting int (N/n) frames agrees with the number N specified in the control information;
   wherein the method is used in a development environment for a controller circuit, the data source being the controller circuit and the data sink being a host computer.

6. The method as recited in claim 5, wherein if N=n, the data source transmits a single frame having N data elements, and the data sink recognizes the block as complete already after receiving the single frame.

7. The method as recited in claim 5, wherein the data source transmits the block at a point in time specified in the control information.

8. The method as recited in claim 5, wherein the data source forms the block from a plurality of parameters specified in the control information.

9. The method as recited in claim 5, wherein the bus is a CAN bus.

* * * * *